United States Patent
Kim et al.

(10) Patent No.: US 9,740,301 B2
(45) Date of Patent: Aug. 22, 2017

(54) KEYBOARD AND MOBILE DEVICE WITH RADIO FREQUENCY ANTENNA

(71) Applicant: Samsung Electronics Co., Ltd., Gyeonggi-do (KR)

(72) Inventors: Ki-Jung Kim, Gyeongsangbuk-do (KR); Jun-Hui Lee, Gyeongsangbuk-do (KR); In-Kyu Choi, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 144 days.

(21) Appl. No.: 14/074,155

(22) Filed: Nov. 7, 2013

(65) Prior Publication Data

US 2014/0132461 A1    May 15, 2014

(30) Foreign Application Priority Data

Nov. 15, 2012   (KR) .................. 10-2012-0129816

(51) Int. Cl.
*H01Q 1/22*     (2006.01)
*G06F 3/023*    (2006.01)
*G06F 1/16*     (2006.01)
*H01Q 1/24*     (2006.01)
*H01Q 7/00*     (2006.01)

(52) U.S. Cl.
CPC .......... *G06F 3/0231* (2013.01); *G06F 1/1698* (2013.01); *H01Q 1/2258* (2013.01); *H01Q 1/2266* (2013.01); *H01Q 1/241* (2013.01); *H01Q 1/242* (2013.01); *H01Q 1/243* (2013.01); *H01Q 7/00* (2013.01)

(58) Field of Classification Search
CPC ...... H01Q 1/2266; H01Q 1/2258; H01Q 1/38; H01Q 1/241–1/243; G06F 1/1624; G06F 1/1664; G06F 1/1666; G06F 1/1667; G06F 1/1669; G06F 1/1671; G06F 1/1673; G06F 1/169; G06F 1/3271; G06F 1/1698; G06F 3/0231; G06F 3/02; G06F 3/0205; G06F 3/0208; G06F 3/021; G06F 3/0213; G06F 3/0216; G06F 3/0219; G06F 3/0221; G06F 3/023; G06F 3/0238; G06F 3/0489; G06F 3/04895
USPC .......................................... 343/702; 345/168
See application file for complete search history.

(56) References Cited

U.S. PATENT DOCUMENTS 5,793,359 A * 8/1998 Ushikubo ............. G06F 3/0213
                                                345/169
6,850,227 B2 * 2/2005 Takahashi ............ G06F 3/0202
                                                 341/22

(Continued)

FOREIGN PATENT DOCUMENTS

CN   102419633    4/2012
JP   2003131792   5/2003

OTHER PUBLICATIONS

European Search Report dated Jan. 14, 2015 issued in counterpart application No. 13192846.7-1959.

(Continued)

*Primary Examiner* — Jessica Han
*Assistant Examiner* — Awat Salih
(74) *Attorney, Agent, or Firm* — The Farrell Law Firm, P.C.

(57) ABSTRACT

A keyboard and mobile device are provided that include a plurality of keys installed in the keyboard or mobile device, and a radio frequency antenna device mounted below the plurality of keys.

16 Claims, 3 Drawing Sheets

(56) References Cited

U.S. PATENT DOCUMENTS

| | | | |
|---|---|---|---|
| 7,319,434 B2* | 1/2008 | Hirota | G06F 1/1616 |
| | | | 343/702 |
| 7,999,748 B2* | 8/2011 | Ligtenberg | H01H 13/705 |
| | | | 343/702 |
| 8,953,327 B1* | 2/2015 | Salmon | G06F 1/1652 |
| | | | 160/242 |
| 2006/0187129 A1 | 8/2006 | Hirota | |
| 2007/0075986 A1* | 4/2007 | Chen | G06F 3/0418 |
| | | | 345/173 |
| 2008/0284663 A1* | 11/2008 | Arima | G06F 1/1616 |
| | | | 343/702 |
| 2011/0169770 A1* | 7/2011 | Mishina | G06F 1/1656 |
| | | | 345/174 |
| 2012/0075189 A1* | 3/2012 | Hsu | G06F 1/1698 |
| | | | 345/168 |
| 2012/0146817 A1* | 6/2012 | Tang | H01H 13/705 |
| | | | 341/22 |
| 2012/0162890 A1* | 6/2012 | Chuang | G06F 1/1616 |
| | | | 361/679.09 |
| 2012/0212417 A1* | 8/2012 | Chen | G06F 3/0202 |
| | | | 345/168 |
| 2014/0011447 A1* | 1/2014 | Konanur | H04B 5/00 |
| | | | 455/41.1 |
| 2014/0092543 A1* | 4/2014 | Yang | G06F 1/1698 |
| | | | 361/679.08 |
| 2014/0203988 A1* | 7/2014 | Yang | H01Q 7/00 |
| | | | 343/842 |
| 2016/0093940 A1* | 3/2016 | Pan | H01Q 1/2258 |
| | | | 455/277.1 |
| 2016/0119036 A1* | 4/2016 | Yang | H04B 5/0037 |
| | | | 343/788 |

OTHER PUBLICATIONS

Chinese Office Action dated Jul. 3, 2017 issued in counterpart application No. 201310574160.2, 21 pages.

* cited by examiner

KEYBOARD AND MOBILE DEVICE WITH RADIO FREQUENCY ANTENNA

PRIORITY

This application claims priority under 35 U.S.C. §119(a) to Korean Application Serial No. 10-2012-0129816, which was filed in the Korean Intellectual Property Office on Nov. 15, 2012, the content of which is incorporated herein by reference.

BACKGROUND OF THE INVENTION

1. Field of the Invention

The present invention relates generally to mobile device antennas, and more particularly, to a keyboard and mobile device having a radio frequency antenna device mounted below spaces that exist between keys of the keyboard.

2. Description of the Related Art

Near Field Communication (NFC), which uses radio frequency identification tags, transmits data between terminals in close range in a non-contact manner using a band of about 13.56 MHz. NFC is widely used for transmission of item information in stores, such as, for example supermarkets, or travel information for visitors. NFC is also used for traffic access control locking devices and for making payments.

In recent years, NFC has been applied to mobile devices such as, for example, notebook computers, tablet Personal Computers (PCs), and smart phones. The mobile devices include functions that allow for information exchange between terminals, making payments, placing ticket reservation, and performing searches using NFC. Accordingly, demands for antenna devices used in NFC are increasing.

As shown in FIGS. 1 and 2, an NFC antenna device 1 is embedded in a keyboard 3 of a notebook computer 2.

However, as shown in FIG. 1, installation space for the NFC antenna device 1 in the notebook computer 2 is limited due to the mounting of a battery or a battery cover. The NFC antenna device 1 is mounted to a space other than the area of the keyboard, causing a transverse or longitudinal length, or a thickness, of the keyboard to be increased.

Accordingly, the keyboard design is limited and does not have an appealing external appearance.

SUMMARY OF THE INVENTION

The present invention has been made to address at least the above problems and/or disadvantages and to provide at least the advantages described below. Accordingly, an aspect of the present invention provides a mounting space for mounting a radio frequency antenna device below spaces that exist between keys of the keyboard. This allows a thickness of an electronic device or a mobile device with the keyboard to be reduced. The electronic device or the mobile device can be made slim and have more appealing design. Additionally, better use is made of the space within the keyboard.

According to one aspect of the present invention, a keyboard is provided that includes a plurality of keys installed in the keyboard, and a radio frequency antenna device mounted below the plurality of keys.

According to another aspect of the present invention, a mobile device is provided that includes a plurality of keys installed in the mobile device, and a radio frequency antenna device mounted below the plurality of keys.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
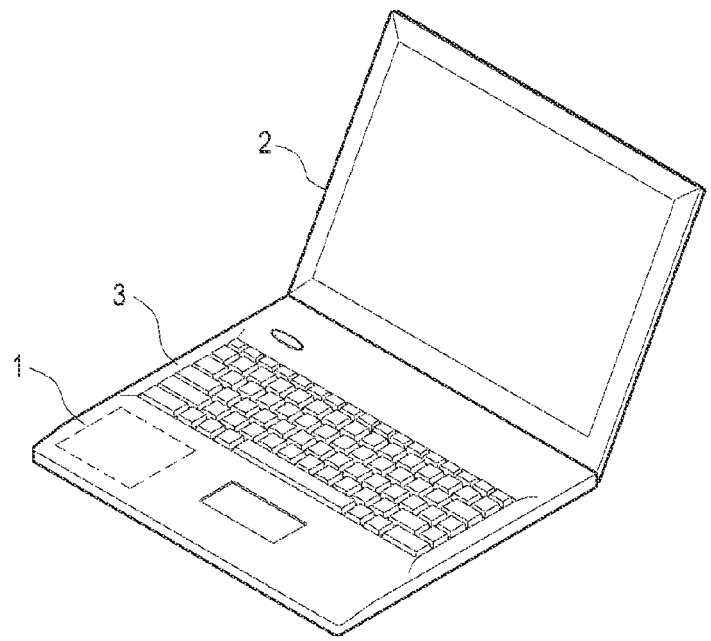
FIG. 1 is a diagram illustrating a perspective view of a notebook computer employing an NFC antenna device.
Figure 2:
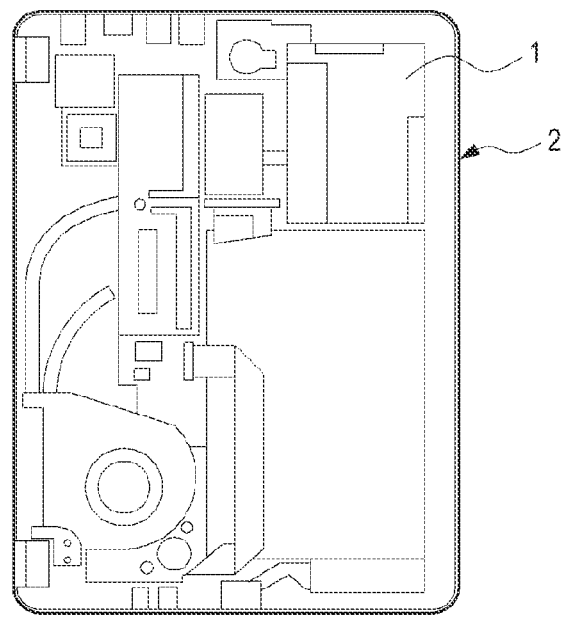
FIG. 2 is a diagram illustrating an interior of a keypad of the notebook computer employing an NFC antenna device.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 3:
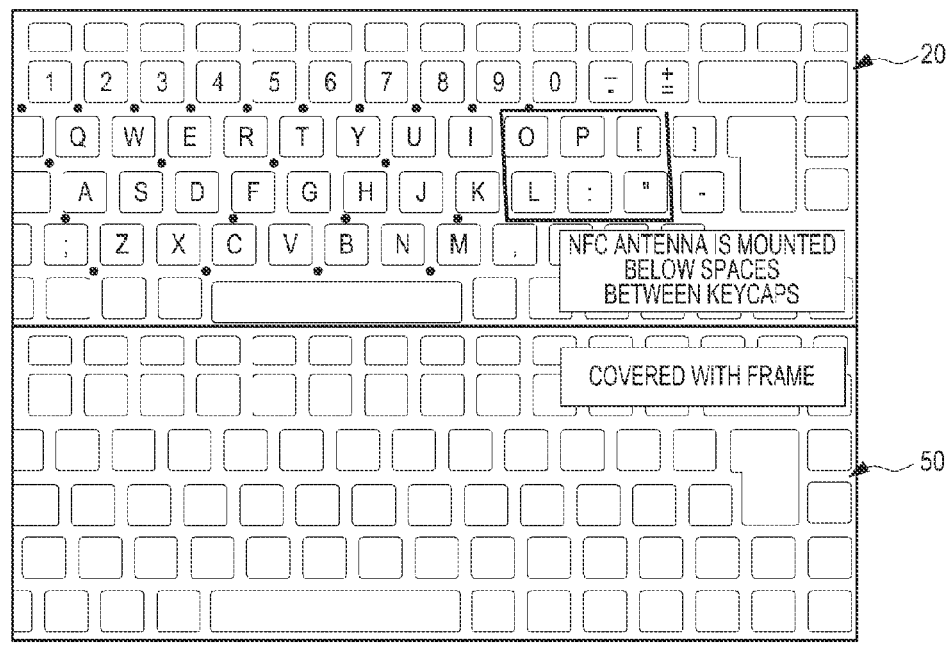
FIG. 3 is a diagram illustrating a structure of a radio frequency antenna device, according to an embodiment of the present invention.
Figure 4:
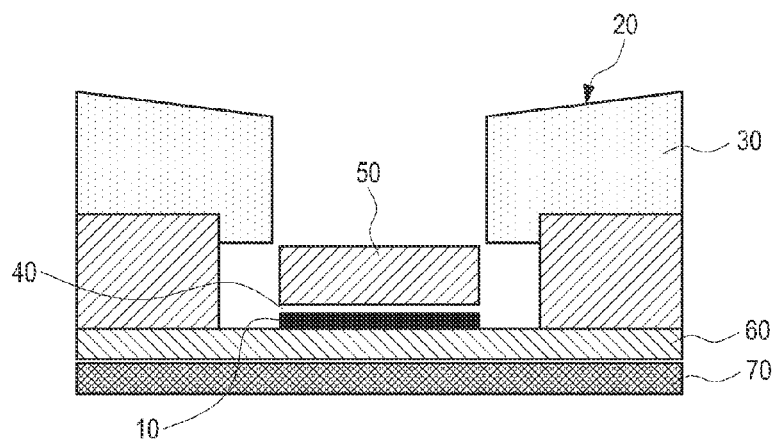
FIG. 4 is a diagram illustrating a side sectional view of a structure in which the radio frequency antenna device is mounted to a keyboard, according to an embodiment of the present invention.
Figure 6:
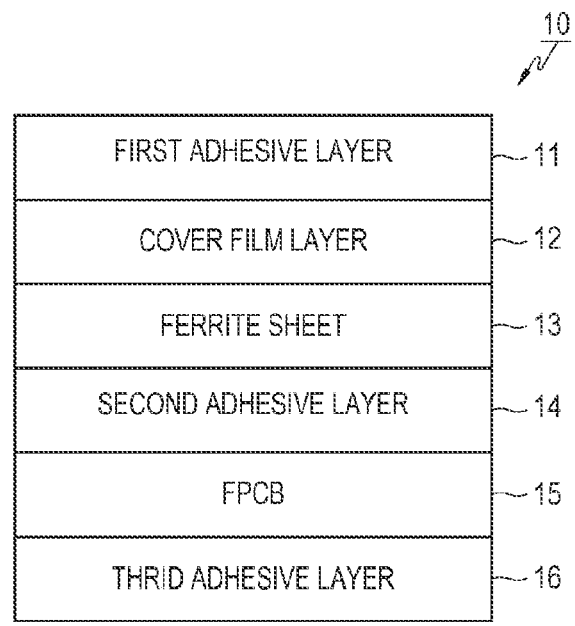
FIG. 6 is a diagram illustrating a configuration of the radio frequency antenna device, according to an embodiment of the present invention.

Referring initially to FIG. 3, a diagram illustrates a structure of a radio frequency antenna device, according to an embodiment of the present invention. In FIG. 4, a diagram illustrating a side sectional view of a structure in which the radio frequency antenna device is mounted to a keyboard, according to an embodiment of the present invention Here, as shown in the FIG. 6, the NFC antenna device comprises a first adhesive layer 11, a cover film layer 12 mounted below the first adhesive layer 11, a ferrite sheet 13 mounted below the cover film layer 12, a second adhesive layer 14 mounted below the ferrite sheet 13, a FPCB 15 mounted below the second adhesive layer 14, and a third adhesive layer 16 mounted below the FCBB 15.

As shown in FIG. 4, a plurality of keys 30 are installed in a keyboard 20, and a mounting space 40 is disposed below spaces that exist between the keys 30, such that the NFC antenna device 10 may be mounted therein.

Specifically, the NFC antenna device 10 is mounted below spaces that exist between the keys 30.

Since the NFC antenna device is mounted below the spaces that exist between the keys of the keyboard, a thickness of an electronic device or a mobile device having the keyboard can be reduced resulting in a more appealing design, and spaces within the keyboard can be made better use of.

In addition, the NFC antenna device 10 is preferably mounted below spaces around a periphery of a specific key block, which includes the key 30. Thus, the NFC antenna device is mounted below spaces that exist between keys of the specific key block and keys adjacent to the key block.

As illustrated in FIG. 3, the specific key block includes "O", "P", "[", "L", ";" and "'" keys, and the NFC antenna device 10 is preferably mounted below the periphery of the specific key block.

In alternative embodiments of the present invention, the specific key block may include keys other than the above-described keys, such as, for example, "Q", "W", "E", "R", "T", and "Y" keys.

As shown in FIG. 4, since the mounting space 40 is formed below the spaces between the keys 30 within the keyboard 20, the NFC antenna device 10 can be mounted within the keyboard 20, and the remaining space of the keyboard 20 can be efficiently utilized. Specifically, the thickness of the keyboard 20 can be further reduced, so the keyboard 20 can be made slim.

Additionally, as shown in FIGS. 3 and 4, a frame 50 is installed above the NFC antenna device 10 to cover and protect the NFC antenna device 10. The frame 50 has a shape that corresponds to the key configuration of the keyboard 20, allowing the keys 30 of the keyboard to function properly.

Figure 5:
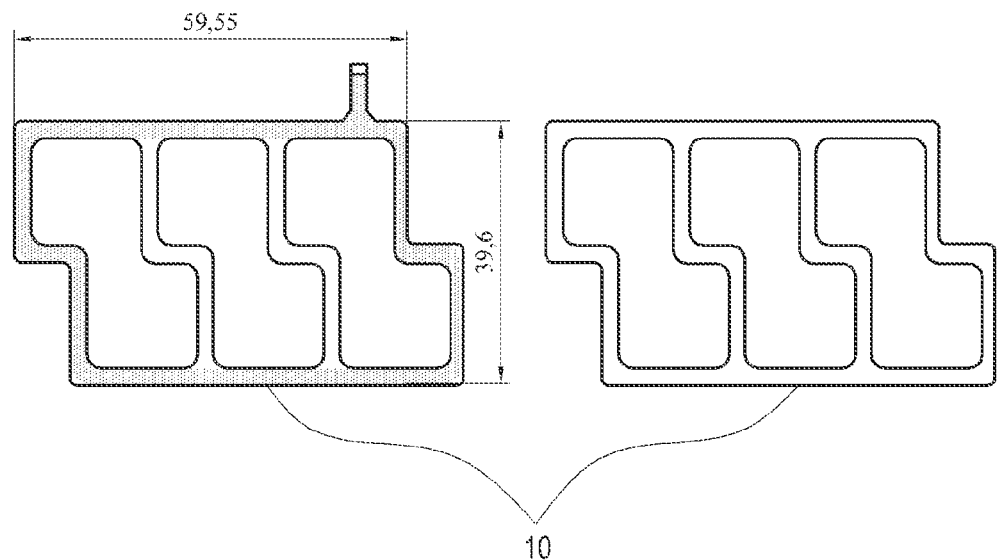
FIG. 5 is a diagram illustrating a shape of the radio frequency antenna device, according to an embodiment of the present invention.

Referring now to FIG. 5, a diagram illustrates a shape of the radio frequency antenna device, according to an embodiment of the present invention. The NFC antenna device 10 is formed in a shape corresponding to the arrangement of the keys 30.

An assembly process of the keyboard 20 with the NFC antenna device 10 will be described in greater detail below with reference to FIGS. 4 and 5.

As shown in FIG. 4, a reinforcing plate 70 is installed within the keyboard 20. A membrane 60 is installed above the reinforcing plate 70. The NFC antenna device 10 is installed on an upper surface of the membrane 60. The frame 50 is installed above the NFC antenna device 10. The keyboard 20 is installed above the frame 50.

The mounting space 40 is formed between the membrane 60 and the frame 50. Thus, the NFC antenna device 10 is mounted in the mounting space 40.

Specifically, the NFC antenna device 10 is mounted in the mounting space 40, and below the plurality of keys 30 at the same time.

Accordingly, embodiments of the present invention provide the keyboard 20 in which the NFC antenna device 10 is mounted below spaces that exist between the keys 30 of the keyboard 20, so that the thickness of the keyboard can be reduced, making the keyboard slim. Moreover, the keyboard can be mounted to the notebook computer in manner in which the space of the keyboard is efficiently utilized and the notebook computer is more appealing.

In embodiments of the present invention, the NFC antenna device is described to be installed in the keyboard and the mobile device. However, the NFC antenna device may be installed in various other electronic devices, such as, for example, notebook computers, desktop computers, and tablet PCs, which employ the keyboard.

According to embodiments of the present invention, electronic devices may include all information technology devices, multimedia devices, and application devices for the information technology devices and the multimedia devices, such as, for example, a Portable Multimedia Player (PMP), an MP3 player, a navigation system, a game machine, a notebook computer, an advertising board, a Television (TV), a digital broadcasting player, Personal Digital Assistant (PDA), a Digital Multimedia Broadcasting (DMB) phone, and a smart phone, as well as all mobile communication terminals operated by communication protocols corresponding to the various communication systems.

The keyboard with the radio frequency antenna device, and the mobile device including the same, are not limited to the above-described embodiments and the accompanying drawings, and it will be obvious to those skilled in the art to which the present invention pertains that various substitutions, modifications and changes can be made for various forms of terminals.

While the invention has been shown and descried with reference to certain embodiments thereof, it will be understood by those skilled in the art that various changes in form and detail may be made therein without departing from the spirit and scope of the invention as defined by the appended claims.

What is claimed is:

1. A keyboard comprising:
   a plurality of keys installed in the keyboard;
   a radio frequency antenna device mounted below the plurality of keys; and
   a membrane for supporting the radio frequency antenna device,
   wherein the radio frequency antenna device is formed in a shape matching a frame, the frame being installed above the radio frequency antenna device, and
   wherein the radio frequency antenna device is formed in a shape matching an arrangement of two or more of the plurality of keys, around a whole periphery of a block of two or more keys of the plurality of keys.

2. The keyboard of claim 1, wherein the radio frequency antenna device is mounted below spaces that exist between the two or more of the plurality of keys.

3. The keyboard of claim 1, wherein the radio frequency antenna device is mounted below spaces around the periphery of the block of two or more keys of the plurality of keys, and between the block of the two or more keys and keys adjacent to the block of two or more keys.

4. The keyboard of claim 1, wherein the block of two or more keys comprises "O", "P", "[", "L", ";" and "'" keys.

5. The keyboard of claim 1, further comprising a frame for covering the radio frequency antenna device installed above the radio frequency antenna device.

6. The keyboard of claim 1, wherein a lower surface of the radio frequency antenna device is installed on the membrane.

7. The keyboard of claim 6, further comprising a reinforcing plate upon which the membrane is installed.

8. The keyboard of claim 1, wherein a mounting space is formed below spaces that exist between two or more of the plurality of keys such that the radio frequency antenna device is mounted therein.

9. A mobile device comprising:
   a plurality of keys installed in the mobile device;
   a radio frequency antenna device mounted below the plurality of keys; and
   a membrane for supporting the radio frequency antenna device,
   wherein the radio frequency antenna device is formed in a shape matching a frame, the frame being installed above the radio frequency antenna device, and
   wherein the radio frequency antenna device is formed in a shape matching an arrangement of two or more of the plurality of keys, around a whole periphery of a block of two or more keys of the plurality of keys.

10. The mobile device of claim 9, wherein the radio frequency antenna device is mounted below spaces that exist between the two or more of the plurality of keys.

11. The mobile device of claim 9, wherein the radio frequency antenna device is mounted below spaces around the periphery of the block of two or more of the plurality of keys, and between the block of the two or more keys and keys adjacent to the block of two or more keys.

12. The mobile device of claim 9, wherein the block of two or more keys comprises "O", "P", "[", "L", ";" and "'" keys.

13. The mobile device of claim 9, further comprising a frame for covering the radio frequency antenna device installed above the radio frequency antenna device.

14. The mobile device of claim 9, wherein a lower surface of the radio frequency antenna device is installed on the membrane.

15. The mobile device of claim 14, further comprising a reinforcing plate upon which the membrane is installed.

16. The mobile device of claim 9, wherein a mounting space is formed below spaces that exist between two or more of the plurality of keys such that the radio frequency antenna device is mounted therein.

\* \* \* \* \*